(12) United States Patent
Guthmann et al.

(10) Patent No.: US 10,524,251 B2
(45) Date of Patent: Dec. 31, 2019

(54) EFFICIENT CONTROL SIGNALING USING COMMON SEARCH SPACE

(71) Applicant: Telefonaktiebolaget LM Ericsson (publ), Stockholm (SE)

(72) Inventors: Axel Guthmann, Nacka (SE); Robert Baldemair, Solna (SE); Daniel Chen Larsson, Lund (SE); Erik Dahlman, Stockholm (SE); Sorour Falahati, Stockholm (SE); Stefan Parkvall, Bromma (SE)

(73) Assignee: Telefonaktiebolaget LM Ericsson (Publ) (SE)

( * ) Notice: Subject to any disclaimer, the term of this patent is extended or adjusted under 35 U.S.C. 154(b) by 0 days.

(21) Appl. No.: 16/384,183

(22) Filed: Apr. 15, 2019

(65) Prior Publication Data

US 2019/0261331 A1 Aug. 22, 2019

Related U.S. Application Data

(63) Continuation of application No. PCT/SE2019/050125, filed on Feb. 14, 2019.

(30) Foreign Application Priority Data

Feb. 16, 2018 (SE) ...................... 1800040

(51) Int. Cl.
*H04W 72/04* (2009.01)
*H04L 1/16* (2006.01)
*H04L 5/00* (2006.01)

(52) U.S. Cl.
CPC .......... *H04W 72/042* (2013.01); *H04L 1/1614* (2013.01); *H04L 5/0082* (2013.01); *H04W 72/0453* (2013.01)

(58) Field of Classification Search
CPC ............ H04W 72/042; H04W 72/0453; H04L 1/1614; H04L 5/0082
See application file for complete search history.

(56) References Cited

U.S. PATENT DOCUMENTS

| | | | |
|---|---|---|---|
| 2013/0242947 A1* | 9/2013 | Chen ...................... | H04W 72/04 370/335 |
| 2015/0124732 A1* | 5/2015 | Seo ...................... | H04B 7/0413 370/329 |

(Continued)

FOREIGN PATENT DOCUMENTS

EP 3282633 A1 2/2018

OTHER PUBLICATIONS

International Search Report and Written Opinion dated Apr. 26, 2019 for International Application No. PCT/SE2019/050125 dated Feb. 14, 2019, consisting of 10-pages.

(Continued)

*Primary Examiner* — Will W Lin
(74) *Attorney, Agent, or Firm* — Christopher & Weisberg, P.A.

(57) ABSTRACT

There is disclosed a method of operating a network node in a radio access network, the method includes transmitting a resource allocation message comprising a bit field, the resource allocation message being transmitted for reception in a common search space to which a first bandwidth part with a first unit size of resource allocation is associated. The bit field allocates resources in a second bandwidth part with a second unit size of resource allocation. The disclosure also pertains to related devices and methods.

20 Claims, 3 Drawing Sheets

```
            PRBG1 PRBG2 PRBG3....
              0     1     0

Common Search Space      BWP2, PRBG size 2

010111101111
   BWP1, PRBG size 1

PRBG1 PRBG2 PRBG3...
              0     1     0

BWP3, PRBG size 3
```

(56) References Cited

U.S. PATENT DOCUMENTS

| | | | | |
|---|---|---|---|---|
| 2015/0365145 | A1* | 12/2015 | Schober | H04B 7/0417 |
| | | | | 375/267 |
| 2016/0050647 | A1* | 2/2016 | Hwang | H04L 12/4641 |
| | | | | 370/329 |
| 2016/0302174 | A1* | 10/2016 | Chatterjee | H04B 7/0486 |
| 2018/0145809 | A1* | 5/2018 | Kwak | H04L 5/0048 |
| 2019/0007959 | A1* | 1/2019 | Hwang | H04W 72/1289 |

OTHER PUBLICATIONS

3GPP TSG RAN WG1 Meeting AI 1801 R1-1800384; Title: Remaining issues on bandwidth part operation; Agenda item: 7.3.4.1; Source: LG Electronics; Document for: Discussion and decision; Location and Date: Vancouver, Canada Jan. 22-26, 2018, consisting of 14-pages.

3GPP TSG RAN WG1 Meeting 90bis R1-1717954; Title: Further discussion on DCI formats; Agenda Item: 7.3.1.4; Source: LG Electronics; Document for: Discussion and decision; Location and Date: Prague, CZ, Oct. 9-13, 2017, consisting of 6-pages.

* cited by examiner

EFFICIENT CONTROL SIGNALING USING COMMON SEARCH SPACE

CROSS-REFERENCE TO RELATED APPLICATIONS

This application is a continuation of International Application No. PCT/SE2019/050125, filed Feb. 14, 2019, which claims the benefit of Swedish National Application No. 1800040-6, filed on Feb. 16, 2018, the entireties of both of which are incorporated herein by reference.

TECHNICAL FIELD

This disclosure pertains to radio access technology, in particular in the context of 5G networks.

BACKGROUND

In radio access networks like NR networks, user equipments (UEs) may be configured to operate of different bandwidth parts of a carrier, between which they may be switched, e.g. with control information messages like DCI messages. This possibility brings increased flexibility and may improve performance, however, it may require new ways of managing and controlling UEs.

SUMMARY

The present disclosure aims at providing new ways of managing UEs in radio access networks, in particular in networks in which the UEs may be able to switch between bandwidth parts, respectively may be activated on different bandwidth parts. In particular, consistent, reliable and efficient handling of control signaling in common search spaces may be facilitated. The approaches are particularly advantageously implemented in a 5th Generation (5G) telecommunication network or 5G radio access technology or network (RAT/RAN), in particular according to 3GPP ($3^{rd}$ Generation Partnership Project, a standardization organization). A suitable RAN may in particular be a RAN according to NR, for example release 15 or later, or LTE Evolution.

There is disclosed a method of operating a network node in a radio access network. The method comprises transmitting a resource allocation message comprising a bit field. The resource allocation message is transmitted for reception in a common search space to which a first bandwidth part with a first unit size of resource allocation is associated, wherein the bit field allocates resources in a second bandwidth part with a second unit size of resource allocation. The method may comprise communicating with the user equipment based on the allocated resources.

Moreover, there is disclosed a network node for a radio access network. The network node is adapted to transmit a resource allocation message comprising a bit field, wherein the resource allocation message is (respectively, the network node being adapted for transmitting accordingly, and/or transmitting accordingly) for reception in a common search space to which a first bandwidth part with a first unit size of resource allocation is associated. The bit field allocates resources in a second bandwidth part with a second unit size of resource allocation. The network node may be adapted to communicate with the user equipment based on the allocated resources. It may be considered that the network node comprises, and/or is adapted for utilizing, processing circuitry and/or radio circuitry, in particular a transmitter and/or transceiver and/or receiver, for transmitting and/or communicating.

There is also proposed a method of operating a user equipment in a radio access network. The method comprises receiving a resource allocation message, the resource allocation message comprising a bit field. The resource allocation message is received in a common search space to which a first bandwidth part with a first unit size of resource allocation is associated, wherein the bit field allocates resources in a second bandwidth part with a second unit size of resource allocation. The method further comprises communicating on the second bandwidth part utilizing the second unit size based on the bit field.

Pertaining to another approach, there is described a user equipment for a radio access network. The user equipment is adapted to receive a resource allocation message. The resource allocation message comprises a bit field. The user equipment is adapted to receive the resource allocation message in a common search space to which a first bandwidth part with a first unit size of resource allocation is associated, wherein the bit field allocates resources in a second bandwidth part with a second unit size of resource allocation. The user equipment further is adapted to communicate on the second bandwidth part utilizing the second unit size based on the bit field.

Transmitting a resource allocation message may be based on, and/or comprise, scheduling one or more user equipments for communicating, in particular on the second bandwidth part, and/or for communicating utilizing the resources to be allocated by the bit field. It should be noted that communicating based on resources may generally be based on considering time delays between transmitter and receiver, such that e.g. a network node may have to consider that transmission on allocated resources require traveling time from a user equipment to the network node.

The first unit size in general may be different from the second unit size. Alternatively, and/or additionally, the first bandwidth part may be different from the first bandwidth part, e.g. in terms of extension in frequency domain (e.g., total number of PRBs and/or subcarriers included in the bandwidth parts and/or addressable in the bandwidth parts) and/or numerology and/or beginning and/or end in frequency domain and/or regarding an associated code like a scrambling code and/or spreading code and/or identifier. It may be considered that even with the same unit size, a bit field may lead to different resources being allocated in different bandwidth parts with different reference points (e.g., lowest or highest frequency or unit/PRB group location). On the other hand, different unit sizes can lead to at least overlapping resources depending on the reference point.

In general, the first bandwidth part and the second bandwidth part may overlap at least in part. It may be considered that the extension in frequency domain of the second bandwidth part is larger than that of the first bandwidth part. The common search space may generally be configured for the first bandwidth part, and/or in relation to and/or parametrized for, the first unit size.

The common search space may generally be included in the first and second bandwidth part. In some variants, the common search space is located at the end or beginning of the first or second bandwidth part in frequency domain (also referred to as frequency space). Generally, a bandwidth part, or a search space like the common search space, may be considered to be located at the beginning of a different bandwidth part, or a bandwidth part it is included in, if its lowest frequency subcarrier and/or frequency and/or physical resource block (or group) coincides and/or overlaps with the corresponding lowest of the bandwidth part. In general, a bandwidth part, or a search space like the common search space, may be considered to be located at the end of a different bandwidth part, or a bandwidth part it is included in, if its highest frequency subcarrier and/or frequency and/or physical resource block (or group) coincides and/or overlaps with the corresponding highest of the bandwidth part. In some cases, the common search space may be located at the beginning of the first bandwidth part and at the end of the second bandwidth part in frequency domain. It should be noted that it is referred to the frequency domain extension of the common search space (e.g., indicated in subcarriers and/or physical resource blocks and/or PRB groups covered by the common search space). A common search space may generally be configured or configurable, e.g. by the network node and/or network, or may be predefined.

It may be considered that a user equipment may be adapted to be configured or configurable, and/or may be configured, with a set of bandwidth parts, the set of bandwidth parts comprising a plurality of bandwidth parts, on one of which the user equipment may be active and/or may be activated for communicating. The configuration and activation may be effected differently, e.g. with different messages and/or on different layers of control; however, in some cases, the same message or same layer may effect both. The configuration of the set may be with RRC signaling. It may be considered that the activation of a bandwidth part of the set is indicated with physical layer signaling, e.g. DCI signaling or SCI signaling. However, it may be considered that in some case, the activation is based on RRC signaling, and/or due to a timer reaching a threshold, which may for example cause a UE to fall back to a default bandwidth part, which may be configured with and/or within the set.

A unit size may be represented in size of a Physical Resource Block Group, which may comprise N Physical Resource Blocks. Generally, the unit size may represent an extension in frequency space, e.g. a number of subcarriers and/o PRBs, which may be configured or configurable, and/or predefined, e.g. for a default situation. A PRB may comprise 12 subcarriers, which may be predefined. In some cases, the number of subcarriers in a PRB may be configured or configurable; the number of PRBs in a PRB group may be configured or configurable (in particular, explicitly), and/or may depend, e.g. implicitly, on one or more characteristics of the associated bandwidth part, e.g. its total size in frequency domain, which may be represented in subcarriers and/or PRBs. The unit size associated to a bandwidth part may be such that at least 90%, at least 95%, at least 99% or all of the bandwidth part may be covered by the bit field, if it is mapped to frequency domain based on the unit size. A unit size and/or PRB group size of 1 (covering one PRB) may be considered, e.g. for a default bandwidth part or an initial bandwidth part or in narrowband operation.

In some cases, the bit field may indicate a bit map mapped to Physical Resource Block Groups beginning at a reference Physical Resource Block Group, or the bit field may indicate a range of Physical Resource Block Groups and/or in frequency domain, e.g. indicating at least one border like the start and/or end, and/or size of the range (e.g., number of units like PRBs or PRB groups covered). Mapping a bit map may include mapping each bit of the map to a (different) Physical Resource Block Group. The reference Physical Resource Block Group may the lowest frequency Physical Resource Block Group of the Bandwidth Part, or in some cases the highest, or another one, depending on the system setup (e.g., on the standard used). It may be considered that a mapping indication is provided, e.g. in the resource allocation message. The mapping indication may comprise and/or be represented by a flag (e.g., a single bit) or a bit subfield comprising a plurality of bits. The mapping indication may in some cases indicate whether the bit field represents a bit map or a range.

It may generally be indicated that the bit field allocates resources based on the second unit size. This indication may be configured or configurable, or predefined. It may be considered that the indication is configured with the bandwidth part, and/or indicated with the resource allocation message. In some cases, it may be considered that the mapping indication also indicates that the bit field allocates resources based on the second unit size. For example, if the mapping indication indicates a bit map, this may be considered an indication that the bit field allocates resources based on the second unit size, and if the mapping indication indicates a range, this may be considered an indication that the bit field allocates resources based on the first unit size (e.g., has to be interpreted accordingly, which may indicate that the allocation is relative to the first bandwidth part).

Generally, the bandwidth parts may be associated to the same carrier, e.g. defined to be included in the same carrier, and/or have the same numerology, and/or to the same carrier aggregation or the same carrier pair (e.g., in FDD).

It may be considered that the bit field (and/or the resource allocation message) allocates resources for a specific channel, e.g. a data channel and/or broadcast channel. The channel may be a physical channel. In some cases, the channel may be a downlink or a sidelink channel, however it may be an uplink channel. Example channels are PDSCH or PSSCH, or PDCCH or PSCCH, or PUSCH or PSSCH or a Random Access Channel like RACH. In general, the resources may be associated to a specific message format and/or channel, e.g. for control information or data. Alternatively, or additionally, the resources may be allocated for system information and/or random access. System information may for example comprise a system information block, and/or master information block, or Remaining System Information (RMSI). Alternatively, or additionally, the resources may be for transmitting a Random Access preamble (e.g., msg1) or receiving a Random Access response (RAR, or msg2).

It may be considered that the resource allocation message is transmitted on a control channel, in particular a physical control channel like PDCCH or PSSCH. The resource allocation message may be broadcast on the channel, or be intended for a (e.g., configured or configurable) group of UEs, or be intended for a specific UE. Intended target/s may be identified by the resource/s or channel used (or one or more characteristics thereof), and/or by an identifier, in particular a RNTI used for the resource allocation message.

Generally, the resource allocation message may be addressed to a plurality of user equipments. The user equipments may be active on different second bandwidth parts, or the same. In general, each of the user equipments may be configured with the same common search space.

The bit field may allocate resources in a third bandwidth part with a third unit size of resource allocation. The third bandwidth part may be associated to the same user equipment, or to a different UE, and/or be associated to the same carrier, or to another carrier, and/or to the same transmission direction or a different direction. It should be noted that different bandwidth parts may be active for different communication directions. The third bandwidth part and/or the third unit size may be different from the second bandwidth part and/or second unit size, respectively, and/or different from the first bandwidth part and/or first unit size, respectively. Corresponding fourth and arbitrary Nth bandwidth parts and/or unit sizes may be considered.

It may be considered that the resources allocated correspond to the same frequency resources, and/or overlap in different bandwidth parts, or to different resources.

The approaches described herein facilitate efficient resource allocation using a common search space, without being limited to address only the bandwidth part associated to the common search space. Also, resources on multiple bandwidth parts—e.g. of the same set, and/or for different communication directions, and/or on different carriers, and/or for different UEs, may be allocated with a single message, with low signaling overhead. The approaches are particularly suitable if the resources are for broadcast/multicast (in downlink), or for contention-based access (e.g., in uplink), e.g. random access, but can also be implemented for user data signaling. A particularly useful case may be related to broadcast and/or multicast of user data from an information system, e.g. for video.

There is also considered a program product comprising instructions adapted for causing processing circuitry to control and/or perform a method as described herein.

A carrier medium arrangement carrying and/or storing a program product as described herein may be considered.

A bandwidth part and/or search space (in frequency domain) may be characterized by a reference point (e.g., border frequency, e.g. lower or higher border) and the number of units of unit size (e.g., PRB groups) covered and/or included.

A resource allocation may have a unit size, based on which the resources are allocated, e.g. with a range or a bit map. A bit field may be considered to allocate resources, e.g. if it identifies or indicates the resources, which may be used for communicating, e.g. by the intended target/s.

Communicating on a bandwidth part may comprise transmitting and/or receiving in the associated frequency range and/or utilizing the characteristics associated to the bandwidth part. Communicating utilizing a unit size and/or allocation may comprise using the resources allocated according to the unit size, e.g. for transmitting and/or receiving. Receiving on resources may comprise expecting signaling on such resources, and/or searching for signaling on the resources, and/or associating signaling on the resources with the transmitter they are allocated to, and/or decoding and/or demodulating signaling on the resources assuming the transmitter, e.g. by decoding based on an identifier associated to the transmitter. Transmitting utilizing a resource allocation may comprise transmitting on the resources allocated (or part thereof), which may include considering a timing advance or time shift due to signaling travel time, which may be indicated to the transmitter, e.g. with control signaling, for example the resource allocation message, or other control signaling, e.g. another message. A network node allocation resources for transmitting may receive associated signaling utilizing the allocated resources by considering time delays due to signaling travel time.

It may generally be considered that a frequency domain extension of the common search space is included in the first bandwidth part and the second bandwidth part. A bandwidth part may generally extend in frequency domain.

A common search space may be a search space configured or configurable for one or a plurality of UEs. A search space may generally be a resource range, in particular with extension in frequency space. A common search space may in some cases be associated to a common identifier or code or scrambling, e.g. identified with system information, e.g. a SS block. It may be considered that a common search space is associated to a control channel, in particular a PDCCH or PSCCH. The control signaling may be signaling on such a channel, and/or comprise a control information message like a DCI message or SCI message.

Receiving control signaling may comprise, and/or be based on, demodulating and/or decoding the control signaling. Decoding may be based on at least one characteristic. Receiving control signaling in a search space may in general comprise expecting and/or searching for the control signaling on resources of the search space, in particular in an associated frequency range. The common search space may generally be configured and/or predefined, and/or indicate with system information.

In some variants, the at least one characteristic of a bandwidth part may correspond to a scrambling code and/or identifier and/or numerology and/or spreading code, and/or modulation and/or coding scheme, and/or unit size, and/or extension in frequency space and/or reference point. A scrambling code may be used for scrambling bits for transmission. An identifier may be a specific form of scrambling code, used e.g. for scrambling of error coding bits, e.g. CRC and/or parity bits. Different bandwidth parts may differ in at least on such characteristic. Reference points of BWPs may be relative to a carrier, e.g. the same carrier.

It may be considered that the second bandwidth part may comprise the first bandwidth part. Thus, at least part of the frequency resources may be shared. However, in particular due to the difference in characteristic/s, reception of the control signaling based on the second set of characteristics associated to the second bandwidth may fail (e.g., decoding may not be successful). Decoding may generally comprise error detection, which may indicate unsuccessful decoding.

It may be considered that the first bandwidth part may be a default bandwidth part or initial bandwidth part. An initial bandwidth part may be a bandwidth part indicated by, and/or based on, and/or related to, initial random access, e.g. before RRC connected mode has been achieved. An initial bandwidth part may be indicated with system information, e.g. a SS block, or be predefined. A default bandwidth part may be configured with control signaling, e.g. with a RRC configuration. The default bandwidth part may be a bandwidth part a UE falls back to after a configured or configurable timer runs out, if not instructed otherwise, e.g. to reset the timer.

Generally, the at least one (different) characteristic may influence decoding or error decoding, e.g. by scrambling error coding bits like CRC bits or parity bits. Accordingly, the difference in this characteristic may lead to unsuccessful decoding of the control signaling if the second bandwidth part, respectively the associated second set of characteristics is used for decoding.

The bit field may be mapped to a resource structure according to the first bandwidth part. The at least one different characteristic may be a unit size of frequency resources the bit field is mapped to, e.g. if the bit field represents a bit pattern as bit map, in which each bit may indicates a unit of PRBs. In other variants, the bit field may indicate a frequency range within the bandwidth part, e.g. by indicating starting subcarrier or PRB or PRB group, and ending subcarrier or PRB or PRB group, and/or an interval size in PRBs or subcarriers or PRB groups. Such a unit (in particular, PRB group size) may be different between the characteristics, e.g., due to the bandwidth parts having differently sized frequency intervals covered by same or similar sized bit fields, or due to different subcarrier spacing.

A unit size may be configurable, e.g. with a configuration of a bandwidth part. It may be considered that the resource allocation pertains to signaling to be received by the user equipment. Such signaling may in particular in a physical channel and/or data channel and/or data channel, e.g. a PDSCH or PSSCH. Communicating based on the control signaling may comprise receiving such signaling. Alternatively, or additionally, communicating based on the control signaling may comprise transmitting on resources indicated by the bit field, e.g. on physical channel and/or a control channel or data channel, and/or a shared or dedicated channel, e.g. PUSCH or PUCCH or PSSCH or PSCCH.

The resource allocation message may be considered a control information message, and may in particular a DCI message or SCI message. In some cases, it may be of a fallback type, which may for example have a fixed size in bits larger than 10 bits. It may be considered that the resource allocation message is on format 1-0 or 0-0, e.g. according to the NR standard.

Communicating may pertain in particular to a transmission of system information to be received, e.g. Remaining Minimum System Information (RMSI) and/or SIB-transmission (System Information Block, RMSI may be associated to such, in particular to SIB1); such transmission may be for reception by the UE or receiving radio node. In some examples, communicating may in particular pertain to a random access transmission, e.g. transmission of a random access message 1 (msg1) and/or on a random access channel like RACH, e.g., for transmission by the controlled radio node, and/or a random access response (RAR) to be received by the controlled radio node. It may generally be considered that a (frequency) resource allocation and/or code allocation is associated to a time resource allocation, e.g. indicated in the control information signaling, or separately thereof. The control information message may be associated to a specific channel, e.g. control channel, and/or a physical channel, in particular a PDCCH or PSCCH, which may be a common channel, intended for a group of receivers/controlled radio nodes. A resource range for the control information message may be indicated by system information, e.g. in a SS block. The time resource allocation may be associated to a PDSCH or PSSCH transmission (to be received by the controlled radio node), which may in particular comprise RMSI and/or other system information.

BRIEF DESCRIPTION OF THE DRAWINGS

The drawings are provided to illustrate concepts and approaches described herein, and are not intended to limit their scope. The drawings comprise.

DETAILED DESCRIPTION

An identifier may be included in a message in an explicit identification field. However, in some variants, it may be encoded and/or scrambled on bits of the message, in particular on error coding bits like CRC or parity bits. Different identifiers (e.g., in a set) may be configured and/or pre-defined. This approach allows mapping the time resource allocation indication to different tables depending on the identifier. Such identifiers are widely used and may be set up early with great flexibility (or be predefined, requiring no signaling overhead). An identifier may be such that a controlled radio node or signaling radio node will not be able to successfully decode a control information message if it uses the wrong identifier and/or does not use the correct identifier. Examples of identifiers comprise Radio Network Temporary Identifiers, RNTIs. A RNTI may be a common RNTI or a shared RNTI or a UE-specific RNTI. RNTIs of different types comprise a Paging RNTI and/or a System Information RNTI and/or a Random Access RNTI and/or a Cell RNTI. RNTIs, in particular Random Access RNTI (used, e.g., for random access signaling), and/or System Information RNTI (used for indication system information signaling, e.g. via a broadcast channel like a PBCH, Physical Broadcast CHannel, which may be associated to a SS block) and/or Paging RNTI (used for paging one or more controlled radio nodes) may be easily provided, e.g. pre-defined, and/or via broadcast signaling or configuration signaling. A RNTI may be considered to be common or shared if it is cell-wide and/or available for a plurality of UEs, and/or used for multicast or broadcast of information.

Figure 1:
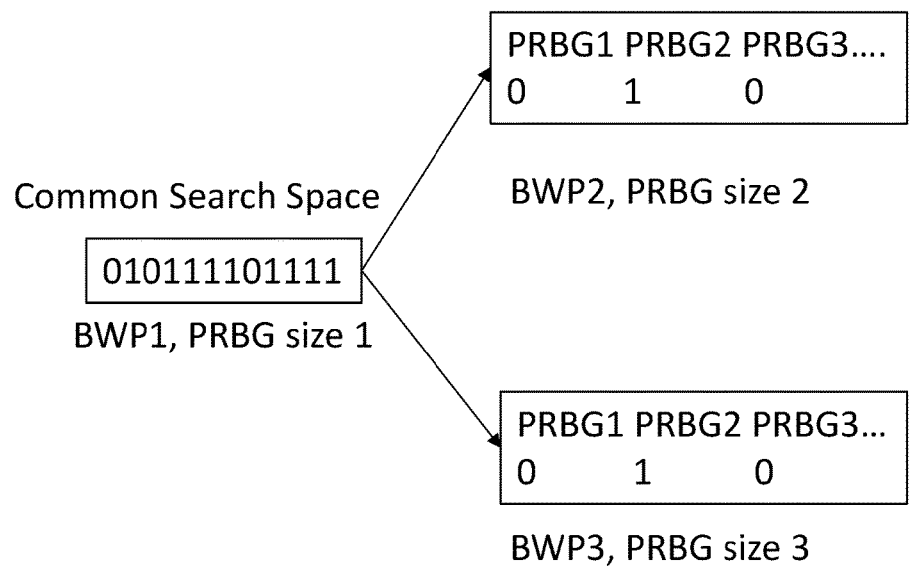
FIG. 1, showing an exemplary mapping of a resource allocation message to different unit sizes.

FIG. 1 schematically shows a bit field in a resource allocation message. The bit field generally may have a size of M bits, which may be fixed and/or or predetermined, e.g. for a fallback type message, or configurable. The size may be at least or equal to 4 bits, at least or equal to 8 bits, at least or equal to 12 bits, or at least or equal to 16 bits. The size may depend on numerology and/or carrier bandwidth used, and/or on the frequency domain extension of the first bandwidth part and/or common search space. The resource allocation message may be transmitted in a common search space, which may be configured to one or more UEs. The common search space may be associated to a first bandwidth part BWP1 and a first unit size (e.g., size of a Physical Resource Block Group, in the example PRBG size 1). The bit field (with 12 bits in FIG. 1 as example) may be mapped to different bandwidth parts BWP2 and BWP 3 (in the example) based on different unit sizes (PRBG size 2 and 3, respectively). A bit map mapping is indicated, wherein each bit of the bit field indicates whether a PRB group (starting from PRBG1, indicating a reference point, e.g. the lowest frequency PRBG of the BWP) is allocated for communicating or not. The resources allocated may be associated to a specific channel and/or format and/or type of signaling, and/or a communication direction, e.g. based on an indication in the resource allocation message, and/or a characteristic of the message, and/or the common search space. The resource allocation message may be a DCI message, and/or scrambled with an identifier like a RNTI, which may be readable/decodable by the UE/s targeted by the message. BWP2 may be on the same carrier as BWP1 and/or BWP3, but may also on a different one. In some cases, BWP2 is associated to the same UE as BWP3, but they may be associated to different UEs. BWP1 may be associated to the UE/s. A BWP may in general be considered to be associated to a UE if it is in the set of BWPs configured for the UE. Communicating on BWP2 and BWP3 may be according to the bit field of the resource allocation message. It may generally be considered that communicating is performed on an active and/or activated bandwidth part. A UE may be active on at least one, more than one, or exactly one BWP (e.g., per carrier). A configured set of BWPs for a UE may comprise 2 or more, in particular 4 BWPs.

Size 1 can be 1 or more PRBs per group. Sizes 2 and 3 may be different from each other and/or size 1, and in some cases may in particular be larger than size 1.

Figure 2:
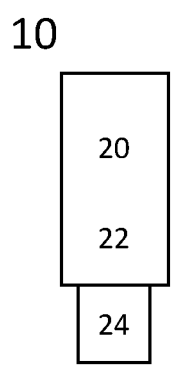
FIG. 2, showing an exemplary radio node that may be implemented as user equipment.

FIG. 2 schematically shows a radio node, in particular a terminal or wireless device 10, which may in particular be implemented as a UE (User Equipment). Radio node 10 comprises processing circuitry (which may also be referred to as control circuitry) 20, which may comprise a controller connected to a memory. Any module of the radio node 10, e.g. a communicating module or determining module, may be implemented in and/or executable by, the processing circuitry 20, in particular as module in the controller. Radio node 10 also comprises radio circuitry 22 providing receiving and transmitting or transceiving functionality (e.g., one or more transmitters and/or receivers and/or transceivers), the radio circuitry 22 being connected or connectable to the processing circuitry. An antenna circuitry 24 of the radio node 10 is connected or connectable to the radio circuitry 22 to collect or send and/or amplify signals. Radio circuitry 22 and the processing circuitry 20 controlling it are configured for cellular communication with a network, e.g. a RAN as described herein, and/or for sidelink communication. Radio node 10 may generally be adapted to carry out any of the methods of operating a radio node like terminal or UE disclosed herein; in particular, it may comprise corresponding circuitry, e.g. processing circuitry, and/or modules.

Figure 3:
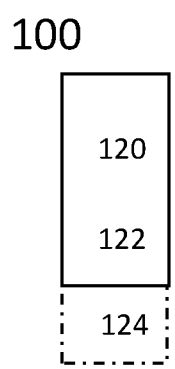
FIG. 3, showing an exemplary radio node that may be implemented as network node.

FIG. 3 schematically show a radio node 100, which may in particular be implemented as a network node 100, for example an eNB or gNB or similar for NR. Radio node 100 comprises processing circuitry (which may also be referred to as control circuitry) 120, which may comprise a controller connected to a memory. Any module, e.g. transmitting module and/or receiving module and/or configuring module of the node 100 may be implemented in and/or executable by the processing circuitry 120. The processing circuitry 120 is connected to control radio circuitry 122 of the node 100, which provides receiver and transmitter and/or transceiver functionality (e.g., comprising one or more transmitters and/or receivers and/or transceivers). An antenna circuitry 124 may be connected or connectable to radio circuitry 122 for signal reception or transmittance and/or amplification. Node 100 may be adapted to carry out any of the methods for operating a radio node or network node disclosed herein; in particular, it may comprise corresponding circuitry, e.g. processing circuitry, and/or modules. The antenna circuitry 124 may be connected to and/or comprise an antenna array. The node 100, respectively its circuitry, may be adapted to perform any of the methods of operating a network node or a radio node as described herein; in particular, it may comprise corresponding circuitry, e.g. processing circuitry, and/or modules. The radio node 100 may generally comprise communication circuitry, e.g. for communication with another network node, like a radio node, and/or with a core network and/or an internet or local net, in particular with an information system, which may provide information and/or data to be transmitted to a user equipment.

Generally, it may be considered that a network node configures, and/or is adapted to configure, a plurality of UEs with the common search space and/or the first bandwidth part, and/or with a first bandwidth part having the first set of characteristics, and/or configures and/or is adapted to configure, a plurality of UEs with a second bandwidth parts and/or second sets of characteristics, which may be the same or different.

References to specific resource structures like transmission timing structure and/or symbol and/or slot and/or mini-slot and/or subcarrier and/or carrier may pertain to a specific numerology, which may be predefined and/or configured or configurable. A transmission timing structure may represent a time interval, which may cover one or more symbols. Some examples of a transmission timing structure are transmission time interval (TTI), subframe, slot and mini-slot. A slot may comprise a predetermined, e.g. predefined and/or configured or configurable, number of symbols, e.g. 6 or 7, or 12 or 14. A mini-slot may comprise a number of symbols (which may in particular be configurable or configured) smaller than the number of symbols of a slot, in particular 1, 2, 3 or 4 symbols. A transmission timing structure may cover a time interval of a specific length, which may be dependent on symbol time length and/or cyclic prefix used. A transmission timing structure may pertain to, and/or cover, a specific time interval in a time stream, e.g. synchronized for communication. Timing structures used and/or scheduled for transmission, e.g. slot and/or mini-slots, may be scheduled in relation to, and/or synchronized to, a timing structure provided and/or defined by other transmission timing structures. Such transmission timing structures may define a timing grid, e.g., with symbol time intervals within individual structures representing the smallest timing units. Such a timing grid may for example be defined by slots or subframes (wherein in some cases, subframes may be considered specific variants of slots). A transmission timing structure may have a duration (length in time) determined based on the durations of its symbols, possibly in addition to cyclic prefix/es used. The symbols of a transmission timing structure may have the same duration, or may in some variants have different duration. The number of symbols in a transmission timing structure may be predefined and/or configured or configurable, and/or be dependent on numerology. The timing of a mini-slot may generally be configured or configurable, in particular by the network and/or a network node. The timing may be configurable to start and/or end at any symbol of the transmission timing structure, in particular one or more slots.

There is generally considered a program product comprising instructions adapted for causing processing and/or control circuitry to carry out and/or control any method described herein, in particular when executed on the processing and/or control circuitry. Also, there is considered a carrier medium arrangement carrying and/or storing a program product as described herein.

A carrier medium arrangement may comprise one or more carrier media. Generally, a carrier medium may be accessible and/or readable and/or receivable by processing or control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

A system comprising one or more radio nodes as described herein, in particular a network node and a user equipment, is described. The system may be a wireless communication system, and/or provide and/or represent a radio access network.

Moreover, there may be generally considered a method of operating an information system, the method comprising providing information. Alternatively, or additionally, an information system adapted for providing information may be considered. Providing information may comprise providing information for, and/or to, a target system, which may comprise and/or be implemented as radio access network and/or a radio node, in particular a network node or user equipment or terminal. Providing information may comprise transferring and/or streaming and/or sending and/or passing on the information, and/or offering the information for such and/or for download, and/or triggering such providing, e.g. by triggering a different system or node to stream and/or transfer and/or send and/or pass on the information. The information system may comprise, and/or be connected or connectable to, a target, for example via one or more intermediate systems, e.g. a core network and/or internet and/or private or local network. Information may be provided utilizing and/or via such intermediate system/s. Providing information may be for radio transmission and/or for transmission via an air interface and/or utilizing a RAN or radio node as described herein. Connecting the information system to a target, and/or providing information, may be based on a target indication, and/or adaptive to a target indication. A target indication may indicate the target, and/or one or more parameters of transmission pertaining to the target and/or the paths or connections over which the information is provided to the target. Such parameter/s may in particular pertain to the air interface and/or radio access network and/or radio node and/or network node. Example parameters may indicate for example type and/or nature of the target, and/or transmission capacity (e.g., data rate) and/or latency and/or reliability and/or cost, respectively one or more estimates thereof. The target indication may be provided by the target, or determined by the information system, e.g. based on information received from the target and/or historical information, and/or be provided by a user, for example a user operating the target or a device in communication with the target, e.g. via the RAN and/or air interface. For example, a user may indicate on a user equipment communicating with the information system that information is to be provided via a RAN, e.g. by selecting from a selection provided by the information system, for example on a user application or user interface, which may be a web interface. An information system may comprise one or more information nodes. An information node may generally comprise processing circuitry and/or communication circuitry. In particular, an information system and/or an information node may be implemented as a computer and/or a computer arrangement, e.g. a host computer or host computer arrangement and/or server or server arrangement. In some variants, an interaction server (e.g., web server) of the information system may provide a user interface, and based on user input may trigger transmitting and/or streaming information provision to the user (and/or the target) from another server, which may be connected or connectable to the interaction server and/or be part of the information system or be connected or connectable thereto. The information may be any kind of data, in particular data intended for a user of for use at a terminal, e.g. video data and/or audio data and/or location data and/or interactive data and/or game-related data and/or environmental data and/or technical data and/or traffic data and/or vehicular data and/or circumstantial data and/or operational data. The information provided by the information system may be mapped to, and/or mappable to, and/or be intended for mapping to, communication or data signaling and/or one or more data channels as described herein (which may be signaling or channel/s of an air interface and/or used within a RAN and/or for radio transmission). It may be considered that the information is formatted based on the target indication and/or target, e.g. regarding data amount and/or data rate and/or data structure and/or timing, which in particular may be pertaining to a mapping to communication or data signaling and/or a data channels. Mapping information to data signaling and/or data channel/s may be considered to refer to using the signaling/channel/s to carry the data, e.g. on higher layers of communication, with the signaling/channel/s underlying the transmission. A target indication generally may comprise different components, which may have different sources, and/or which may indicate different characteristics of the target and/or communication path/s thereto. A format of information may be specifically selected, e.g. from a set of different formats, for information to be transmitted on an air interface and/or by a RAN as described herein. This may be particularly pertinent since an air interface may be limited in terms of capacity and/or of predictability, and/or potentially be cost sensitive. The format may be selected to be adapted to the transmission indication, which may in particular indicate that a RAN or radio node as described herein is in the path (which may be the indicated and/or planned and/or expected path) of information between the target and the information system. A (communication) path of information may represent the interface/s (e.g., air and/or cable interfaces) and/or the intermediate system/s (if any), between the information system and/or the node providing or transferring the information, and the target, over which the information is, or is to be, passed on. A path may be (at least partly) undetermined when a target indication is provided, and/or the information is provided/transferred by the information system, e.g. if an internet is involved, which may comprise multiple, dynamically chosen paths. Information and/or a format used for information may be packet-based, and/or be mapped, and/or be mappable and/or be intended for mapping, to packets. Alternatively, or additionally, there may be considered a method for operating a target device comprising providing a target indicating to an information system. More alternatively, or additionally, a target device may be considered, the target device being adapted for providing a target indication to an information system. In another approach, there may be considered a target indication tool adapted for, and/or comprising an indication module for, providing a target indication to an information system. The target device may generally be a target as described above. A target indication tool may comprise, and/or be implemented as, software and/or application or app, and/or web interface or user interface, and/or may comprise one or more modules for implementing actions performed and/or controlled by the tool. The tool and/or target device may be adapted for, and/or the method may comprise, receiving a user input, based on which a target indicating may be determined and/or provided. Alternatively, or additionally, the tool and/or target device may be adapted for, and/or the method may comprise, receiving information and/or communication signaling carrying information, and/or operating on, and/or presenting (e.g., on a screen and/or as audio or as other form of indication), information. The information may be based on received information and/or communication signaling carrying information. Presenting information may comprise processing received information, e.g. decoding and/or transforming, in particular between different formats, and/or for hardware used for presenting. Operating on information may be independent of or without presenting, and/or proceed or succeed presenting, and/or may be without user interaction or even user reception, for example for automatic processes, or target devices without (e.g., regular) user interaction like MTC devices, of for automotive or transport or industrial use. The information or communication signaling may be expected and/or received based on the target indication. Presenting and/or operating on information may generally comprise one or more processing steps, in particular decoding and/or executing and/or interpreting and/or transforming information.

Operating on information may generally comprise relaying and/or transmitting the information, e.g. on an air interface, which may include mapping the information onto signaling (such mapping may generally pertain to one or more layers, e.g. one or more layers of an air interface, e.g. RLC (Radio Link Control) layer and/or MAC layer and/or physical layer/s). The information may be imprinted (or mapped) on communication signaling based on the target indication, which may make it particularly suitable for use in a RAN (e.g., for a target device like a network node or in particular a UE or terminal). The tool may generally be adapted for use on a target device, like a UE or terminal. Generally, the tool may provide multiple functionalities, e.g. for providing and/or selecting the target indication, and/or presenting, e.g. video and/or audio, and/or operating on and/or storing received information. Providing a target indication may comprise transmitting or transferring the indication as signaling, and/or carried on signaling, in a RAN, for example if the target device is a UE, or the tool for a UE. It should be noted that such provided information may be transferred to the information system via one or more additionally communication interfaces and/or paths and/or connections. The target indication may be a higher-layer indication and/or the information provided by the information system may be higher-layer information, e.g. application layer or user-layer, in particular above radio layers like transport layer and physical layer. The target indication may be mapped on physical layer radio signaling, e.g. related to or on the user-plane, and/or the information may be mapped on physical layer radio communication signaling, e.g. related to or on the user-plane (in particular, in reverse communication directions). The described approaches allow a target indication to be provided, facilitating information to be provided in a specific format particularly suitable and/or adapted to efficiently use an air interface. A user input may for example represent a selection from a plurality of possible transmission modes or formats, and/or paths, e.g. in terms of data rate and/or packaging and/or size of information to be provided by the information system.

In general, a numerology and/or subcarrier spacing may indicate the bandwidth (in frequency domain) of a subcarrier of a carrier, and/or the number of subcarriers in a carrier and/or the numbering of the subcarriers in a carrier. Different numerologies may in particular be different in the bandwidth of a subcarrier. In some variants, all the subcarriers in a carrier have the same bandwidth associated to them. The numerology and/or subcarrier spacing may be different between carriers in particular regarding the subcarrier bandwidth. A symbol time length, and/or a time length of a timing structure pertaining to a carrier may be dependent on the carrier frequency, and/or the subcarrier spacing and/or the numerology. In particular, different numerologies may have different symbol time lengths.

Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

Reference signaling may be signaling comprising one or more reference symbols and/or structures. Reference signaling may be adapted for gauging and/or estimating and/or representing transmission conditions, e.g. channel conditions and/or transmission path conditions and/or channel (or signal or transmission) quality. It may be considered that the transmission characteristics (e.g., signal strength and/or form and/or modulation and/or timing) of reference signaling are available for both transmitter and receiver of the signaling (e.g., due to being predefined and/or configured or configurable and/or being communicated). Different types of reference signaling may be considered, e.g. pertaining to uplink, downlink or sidelink, cell-specific (in particular, cell-wide, e.g., CRS) or device or user specific (addressed to a specific target or user equipment, e.g., CSI-RS), demodulation-related (e.g., DMRS) and/or signal strength related, e.g. power-related or energy-related or amplitude-related (e.g., SRS or pilot signaling) and/or phase-related, etc.

An antenna arrangement may comprise one or more antenna elements (radiating elements), which may be combined in antenna arrays. An antenna array or subarray may comprise one antenna element, or a plurality of antenna elements, which may be arranged e.g. two dimensionally (for example, a panel) or three dimensionally. It may be considered that each antenna array or subarray or element is separately controllable, respectively that different antenna arrays are controllable separately from each other. A single antenna element/radiator may be considered the smallest example of a subarray. Examples of antenna arrays comprise one or more multi-antenna panels or one or more individually controllable antenna elements. An antenna arrangement may comprise a plurality of antenna arrays. It may be considered that an antenna arrangement is associated to a (specific and/or single) radio node, e.g. a configuring or informing or scheduling radio node, e.g. to be controlled or controllable by the radio node. An antenna arrangements associated to a UE or terminal may be smaller (e.g., in size and/or number of antenna elements or arrays) than the antenna arrangement associated to a network node. Antenna elements of an antenna arrangement may be configurable for different arrays, e.g. to change the beam forming characteristics. In particular, antenna arrays may be formed by combining one or more independently or separately controllable antenna elements or subarrays. The beams may be provided by analog beamforming, or in some variants by digital beamforming. The informing radio nodes may be configured with the manner of beam transmission, e.g. by transmitting a corresponding indicator or indication, for example as beam identify indication. However, there may be considered cases in which the informing radio node/s are not configured with such information, and/or operate transparently, not knowing the way of beamforming used. An antenna arrangement may be considered separately controllable in regard to the phase and/or amplitude/power and/or gain of a signal feed to it for transmission, and/or separately controllable antenna arrangements may comprise an independent or separate transmit and/or receive unit and/or ADC (Analog-Digital-Converter, alternatively an ADC chain) to convert digital control information into an analog antenna feed for the whole antenna arrangement (the ADC may be considered part of, and/or connected or connectable to, antenna circuitry). A scenario in which each antenna element is individually controllable may be referred to as digital beamforming, whereas a scenario in which larger arrays/subarrays are separately controllable may be considered an example of analog beamforming. Hybrid forms may be considered.

Uplink or sidelink signaling may be OFDMA (Orthogonal Frequency Division Multiple Access) or SC-FDMA (Single Carrier Frequency Division Multiple Access) signaling. Downlink signaling may in particular be OFDMA signaling. However, signaling is not limited thereto (Filter-Bank based signaling may be considered one alternative).

A radio node may generally be considered a device or node adapted for wireless and/or radio (and/or microwave) frequency communication, and/or for communication utilizing an air interface, e.g. according to a communication standard.

A radio node may be a network node, or a user equipment or terminal. A network node may be any radio node of a wireless communication network, e.g. a base station and/or gNodeB (gNB) and/or eNodeB (eNB) and/or relay node and/or micro/nano/pico/femto node and/or transmission point (TP) and/or access point (AP) and/or other node, in particular for a RAN as described herein.

The terms wireless device, user equipment (UE) and terminal may be considered to be interchangeable in the context of this disclosure. A wireless device, user equipment or terminal may represent an end device for communication utilizing the wireless communication network, and/or be implemented as a user equipment according to a standard. Examples of user equipments may comprise a phone like a smartphone, a personal communication device, a mobile phone or terminal, a computer, in particular laptop, a sensor or machine with radio capability (and/or adapted for the air interface), in particular for MTC (Machine-Type-Communication, sometimes also referred to M2M, Machine-To-Machine), or a vehicle adapted for wireless communication. A user equipment or terminal may be mobile or stationary.

A radio node may generally comprise processing circuitry and/or radio circuitry. A radio node, in particular a network node, may in some cases comprise cable circuitry and/or communication circuitry, with which it may be connected or connectable to another radio node and/or a core network.

Circuitry may comprise integrated circuitry. Processing circuitry may comprise one or more processors and/or controllers (e.g., microcontrollers), and/or ASICs (Application Specific Integrated Circuitry) and/or FPGAs (Field Programmable Gate Array), or similar. It may be considered that processing circuitry comprises, and/or is (operatively) connected or connectable to one or more memories or memory arrangements. A memory arrangement may comprise one or more memories. A memory may be adapted to store digital information. Examples for memories comprise volatile and non-volatile memory, and/or Random Access Memory (RAM), and/or Read-Only-Memory (ROM), and/or magnetic and/or optical memory, and/or flash memory, and/or hard disk memory, and/or EPROM or EEPROM (Erasable Programmable ROM or Electrically Erasable Programmable ROM).

Radio circuitry may comprise one or more transmitters and/or receivers and/or transceivers (a transceiver may operate or be operable as transmitter and receiver, and/or may comprise joint or separated circuitry for receiving and transmitting, e.g. in one package or housing), and/or may comprise one or more amplifiers and/or oscillators and/or filters, and/or may comprise, and/or be connected or connectable to antenna circuitry and/or one or more antennas and/or antenna arrays. An antenna array may comprise one or more antennas, which may be arranged in a dimensional array, e.g. 2D or 3D array, and/or antenna panels. A remote radio head (RRH) may be considered as an example of an antenna array. However, in some variants, a RRH may be also be implemented as a network node, depending on the kind of circuitry and/or functionality implemented therein.

Communication circuitry may comprise radio circuitry and/or cable circuitry. Communication circuitry generally may comprise one or more interfaces, which may be air interface/s and/or cable interface/s and/or optical interface/s, e.g. laser-based. Interface/s may be in particular packet-based. Cable circuitry and/or a cable interfaces may comprise, and/or be connected or connectable to, one or more cables (e.g., optical fiber-based and/or wire-based), which may be directly or indirectly (e.g., via one or more intermediate systems and/or interfaces) be connected or connectable to a target, e.g. controlled by communication circuitry and/or processing circuitry.

Any one or all of the modules disclosed herein may be implemented in software and/or firmware and/or hardware. Different modules may be associated to different components of a radio node, e.g. different circuitries or different parts of a circuitry. It may be considered that a module is distributed over different components and/or circuitries. A program product as described herein may comprise the modules related to a device on which the program product is intended (e.g., a user equipment or network node) to be executed (the execution may be performed on, and/or controlled by the associated circuitry).

A radio access network may be a wireless communication network, and/or a Radio Access Network (RAN) in particular according to a communication standard. A communication standard may in particular a standard according to 3GPP and/or 5G, e.g. according to NR or LTE, in particular LTE Evolution.

A wireless communication network may be and/or comprise a Radio Access Network (RAN), which may be and/or comprise any kind of cellular and/or wireless radio network, which may be connected or connectable to a core network. The approaches described herein are particularly suitable for a 5G network, e.g. LTE Evolution and/or NR (New Radio), respectively successors thereof. A RAN may comprise one or more network nodes, and/or one or more terminals, and/or one or more radio nodes. A network node may in particular be a radio node adapted for radio and/or wireless and/or cellular communication with one or more terminals. A terminal may be any device adapted for radio and/or wireless and/or cellular communication with or within a RAN, e.g. a user equipment (UE) or mobile phone or smartphone or computing device or vehicular communication device or device for machine-type-communication (MTC), etc. A terminal may be mobile, or in some cases stationary. A RAN or a wireless communication network may comprise at least one network node and a UE, or at least two radio nodes. There may be generally considered a wireless communication network or system, e.g. a RAN or RAN system, comprising at least one radio node, and/or at least one network node and at least one terminal.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Control information or a control information message or corresponding signaling (control signaling) may be transmitted on a control channel, e.g. a physical control channel, which may be a downlink channel or (or a sidelink channel in some cases, e.g. one UE scheduling another UE). For example, control information/allocation information may be signaled by a network node on PDCCH (Physical Downlink Control Channel) and/or a PDSCH (Physical Downlink Shared Channel) and/or a HARQ-specific channel. Acknowledgement signaling, e.g. as a form of control information or signaling like uplink control information/signaling, may be transmitted by a terminal on a PUCCH (Physical Uplink Control Channel) and/or PUSCH (Physical Uplink Shared Channel) and/or a HARQ-specific channel. Multiple channels may apply for multi-component/multi-carrier indication or signaling.

Signaling may generally be considered to represent an electromagnetic wave structure (e.g., over a time interval and frequency interval), which is intended to convey information to at least one specific or generic (e.g., anyone who might pick up the signaling) target. A process of signaling may comprise transmitting the signaling. Transmitting signaling, in particular control signaling or communication signaling, e.g. comprising or representing acknowledgement signaling and/or resource requesting information, may comprise encoding and/or modulating. Encoding and/or modulating may comprise error detection coding and/or forward error correction encoding and/or scrambling. Receiving control signaling may comprise corresponding decoding and/or demodulation. Error detection coding may comprise, and/or be based on, parity or checksum approaches, e.g. CRC (Cyclic Redundancy Check). Forward error correction coding may comprise and/or be based on for example turbo coding and/or Reed-Muller coding, and/or polar coding and/or LDPC coding (Low Density Parity Check). The type of coding used may be based on the channel (e.g., physical channel) the coded signal is associated to. A code rate may represent the ratio of the number of information bits before encoding to the number of encoded bits after encoding, considering that encoding adds coding bits for error detection coding and forward error correction. Coded bits may refer to information bits (also called systematic bits) plus coding bits.

Communication signaling may comprise, and/or represent, and/or be implemented as, data signaling, and/or user plane signaling. Communication signaling may be associated to a data channel, e.g. a physical downlink channel or physical uplink channel or physical sidelink channel, in particular a PDSCH (Physical Downlink Shared Channel) or PSSCH (Physical Sidelink Shared Channel). Generally, a data channel may be a shared channel or a dedicated channel. Data signaling may be signaling associated to and/or on a data channel.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information. It may in particular be considered that control signaling as described herein, based on the utilized resource sequence, implicitly indicates the control signaling type.

A resource element may generally describe the smallest individually usable and/or encodable and/or decodable and/or modulatable and/or demodulatable time-frequency resource, and/or may describe a time-frequency resource covering a symbol time length in time and a subcarrier in frequency. A signal may be allocatable and/or allocated to a resource element. A subcarrier may be a subband of a carrier, e.g. as defined by a standard. A carrier may define a frequency and/or frequency band for transmission and/or reception. In some variants, a signal (jointly encoded/modulated) may cover more than one resource elements. A resource element may generally be as defined by a corresponding standard, e.g. NR or LTE. As symbol time length and/or subcarrier spacing (and/or numerology) may be different between different symbols and/or subcarriers, different resource elements may have different extension (length/width) in time and/or frequency domain, in particular resource elements pertaining to different carriers.

A resource generally may represent a time-frequency and/or code resource, on which signaling, e.g. according to a specific format, may be communicated, for example transmitted and/or received, and/or be intended for transmission and/or reception.

A border symbol may generally represent a starting symbol or an ending symbol for transmitting and/or receiving. A starting symbol may in particular be a starting symbol of uplink or sidelink signaling, for example control signaling or data signaling. Such signaling may be on a data channel or control channel, e.g. a physical channel, in particular a physical uplink shared channel (like PUSCH) or a sidelink data or shared channel, or a physical uplink control channel (like PUCCH) or a sidelink control channel. If the starting symbol is associated to control signaling (e.g., on a control channel), the control signaling may be in response to received signaling (in sidelink or downlink), e.g. representing acknowledgement signaling associated thereto, which may be HARQ or ARQ signaling. An ending symbol may represent an ending symbol (in time) of downlink or sidelink transmission or signaling, which may be intended or scheduled for the radio node or user equipment. Such downlink signaling may in particular be data signaling, e.g. on a physical downlink channel like a shared channel, e.g. a PDSCH (Physical Downlink Shared Channel). A starting symbol may be determined based on, and/or in relation to, such an ending symbol.

Configuring a radio node, in particular a terminal or user equipment, may refer to the radio node being adapted or caused or set and/or instructed to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources. A radio node may configure itself, e.g., based on configuration data received from a network or network node. A network node may utilize, and/or be adapted to utilize, its circuitry/ies for configuring. Allocation information may be considered a form of configuration data. Configuration data may comprise and/or be represented by configuration information, and/or one or more corresponding indications and/or message/s Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor.

A resource structure may be considered to be neighbored in frequency domain by another resource structure, if they share a common border frequency, e.g. one as an upper frequency border and the other as a lower frequency border. Such a border may for example be represented by the upper end of a bandwidth assigned to a subcarrier n, which also represents the lower end of a bandwidth assigned to a subcarrier n+1. A resource structure may be considered to be neighbored in time domain by another resource structure, if they share a common border time, e.g. one as an upper (or right in the figures) border and the other as a lower (or left in the figures) border. Such a border may for example be represented by the end of the symbol time interval assigned to a symbol n, which also represents the beginning of a symbol time interval assigned to a symbol n+1.

Generally, a resource structure being neighbored by another resource structure in a domain may also be referred to as abutting and/or bordering the other resource structure in the domain.

A resource structure may general represent a structure in time and/or frequency domain, in particular representing a time interval and a frequency interval. A resource structure may comprise and/or be comprised of resource elements, and/or the time interval of a resource structure may comprise and/or be comprised of symbol time interval/s, and/or the frequency interval of a resource structure may comprise and/or be comprised of subcarrier/s. A resource element may be considered an example for a resource structure, a slot or mini-slot or a Physical Resource Block (PRB) or parts thereof may be considered others. A resource structure may be associated to a specific channel, e.g. a PUSCH or PUCCH, in particular resource structure smaller than a slot or PRB.

Examples of a resource structure in frequency domain comprise a bandwidth or band, or a bandwidth part. A bandwidth part may be a part of a bandwidth available for a radio node for communicating, e.g. due to circuitry and/or configuration and/or regulations and/or a standard. A bandwidth part may be configured or configurable to a radio node. In some variants, a bandwidth part may be the part of a bandwidth used for communicating, e.g. transmitting and/or receiving, by a radio node. The bandwidth part may be smaller than the bandwidth (which may be a device bandwidth defined by the circuitry/configuration of a device, and/or a system bandwidth, e.g. available for a RAN). It may be considered that a bandwidth part comprises one or more resource blocks or resource block groups, in particular one or more PRBs or PRB groups. A bandwidth part may pertain to, and/or comprise, one or more carriers.

A carrier may generally represent a frequency range or band and/or pertain to a central frequency and an associated frequency interval. It may be considered that a carrier comprises a plurality of subcarriers. A carrier may have assigned to it a central frequency or center frequency interval, e.g. represented by one or more subcarriers (to each subcarrier there may be generally assigned a frequency bandwidth or interval). Different carriers may be non-overlapping, and/or may be neighboring in frequency domain.

It should be noted that the term "radio" in this disclosure may be considered to pertain to wireless communication in general, and may also include wireless communication utilizing microwave and/or millimeter and/or other frequencies, in particular between 100 MHz or 1 GHz, and 100 GHz or 20 or 10 GHz. Such communication may utilize one or more carriers.

A radio node, in particular a network node or a terminal, may generally be any device adapted for transmitting and/or receiving radio and/or wireless signals and/or data, in particular communication data, in particular on at least one carrier. The at least one carrier may comprise a carrier accessed based on a LBT procedure (which may be called LBT carrier), e.g., an unlicensed carrier. It may be considered that the carrier is part of a carrier aggregate.

Receiving or transmitting on a cell or carrier may refer to receiving or transmitting utilizing a frequency (band) or spectrum associated to the cell or carrier. A cell may generally comprise and/or be defined by or for one or more carriers, in particular at least one carrier for UL communication/transmission (called UL carrier) and at least one carrier for DL communication/transmission (called DL carrier). It may be considered that a cell comprises different numbers of UL carriers and DL carriers. Alternatively, or additionally, a cell may comprise at least one carrier for UL communication/transmission and DL communication/transmission, e.g., in TDD-based approaches.

A channel may generally be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel, in particular if it is a physical layer channel and/or if it carries user plane information. A channel may be defined for a specific communication direction, or for two complementary communication directions (e.g., UL and DL, or sidelink in two directions), in which case it may be considered to have two component channels, one for each direction. Examples of channels comprise a channel for low latency and/or high reliability transmission, in particular a channel for Ultra-Reliable Low Latency Communication (URLLC), which may be for control and/or data.

In general, a symbol may represent and/or be associated to a symbol time length, which may be dependent on the carrier and/or subcarrier spacing and/or numerology of the associated carrier. Accordingly, a symbol may be considered to indicate a time interval having a symbol time length in relation to frequency domain. A symbol time length may be dependent on a carrier frequency and/or bandwidth and/or numerology and/or subcarrier spacing of, or associated to, a symbol. Accordingly, different symbols may have different symbol time lengths. In particular, numerologies with different subcarrier spacings may have different symbol time length. Generally, a symbol time length may be based on, and/or include, a guard time interval or cyclic extension, e.g. prefix or postfix.

A sidelink may generally represent a communication channel (or channel structure) between two UEs and/or terminals, in which data is transmitted between the participants (UEs and/or terminals) via the communication channel, e.g. directly and/or without being relayed via a network node. A sidelink may be established only and/or directly via air interface/s of the participant, which may be directly linked via the sidelink communication channel. In some variants, sidelink communication may be performed without interaction by a network node, e.g. on fixedly defined resources and/or on resources negotiated between the participants. Alternatively, or additionally, it may be considered that a network node provides some control functionality, e.g. by configuring resources, in particular one or more resource pool/s, for sidelink communication, and/or monitoring a sidelink, e.g. for charging purposes.

Sidelink communication may also be referred to as device-to-device (D2D) communication, and/or in some cases as ProSe (Proximity Services) communication, e.g. in the context of LTE. A sidelink may be implemented in the context of V2x communication (Vehicular communication), e.g. V2V (Vehicle-to-Vehicle), V2I (Vehicle-to-Infrastructure) and/or V2P (Vehicle-to-Person). Any device adapted for sidelink communication may be considered a user equipment or terminal.

A sidelink communication channel (or structure) may comprise one or more (e.g., physical or logical) channels, e.g. a PSCCH (Physical Sidelink Control CHannel, which may for example carry control information like an acknowledgement position indication, and/or a PSSCH (Physical Sidelink Shared CHannel, which for example may carry data and/or acknowledgement signaling). It may be considered that a sidelink communication channel (or structure) pertains to and/or used one or more carrier/s and/or frequency range/s associated to, and/or being used by, cellular communication, e.g. according to a specific license and/or standard. Participants may share a (physical) channel and/or resources, in particular in frequency domain and/or related to a frequency resource like a carrier) of a sidelink, such that two or more participants transmit thereon, e.g. simultaneously, and/or time-shifted, and/or there may be associated specific channels and/or resources to specific participants, so that for example only one participant transmits on a specific channel or on a specific resource or specific resources, e.g., in frequency domain and/or related to one or more carriers or subcarriers.

A sidelink may comply with, and/or be implemented according to, a specific standard, e.g. a LTE-based standard and/or NR. A sidelink may utilize TDD (Time Division Duplex) and/or FDD (Frequency Division Duplex) technology, e.g. as configured by a network node, and/or preconfigured and/or negotiated between the participants. A user equipment may be considered to be adapted for sidelink communication if it, and/or its radio circuitry and/or processing circuitry, is adapted for utilizing a sidelink, e.g. on one or more frequency ranges and/or carriers and/or in one or more formats, in particular according to a specific standard. It may be generally considered that a Radio Access Network is defined by two participants of a sidelink communication. Alternatively, or additionally, a Radio Access Network may be represented, and/or defined with, and/or be related to a network node and/or communication with such a node.

Communication or communicating may generally comprise transmitting and/or receiving signaling. Communication on a sidelink (or sidelink signaling) may comprise utilizing the sidelink for communication (respectively, for signaling). Sidelink transmission and/or transmitting on a sidelink may be considered to comprise transmission utilizing the sidelink, e.g. associated resources and/or transmission formats and/or circuitry and/or the air interface. Sidelink reception and/or receiving on a sidelink may be considered to comprise reception utilizing the sidelink, e.g. associated resources and/or transmission formats and/or circuitry and/or the air interface. Sidelink control information (e.g., SCI) may generally be considered to comprise control information transmitted utilizing a sidelink.

Generally, carrier aggregation (CA) may refer to the concept of a radio connection and/or communication link between a wireless and/or cellular communication network and/or network node and a terminal or on a sidelink comprising a plurality of carriers for at least one direction of transmission (e.g. DL and/or UL), as well as to the aggregate of carriers. A corresponding communication link may be referred to as carrier aggregated communication link or CA communication link; carriers in a carrier aggregate may be referred to as component carriers (CC). In such a link, data may be transmitted over more than one of the carriers and/or all the carriers of the carrier aggregation (the aggregate of carriers). A carrier aggregation may comprise one (or more) dedicated control carriers and/or primary carriers (which may e.g. be referred to as primary component carrier or PCC), over which control information may be transmitted, wherein the control information may refer to the primary carrier and other carriers, which may be referred to as secondary carriers (or secondary component carrier, SCC). However, in some approaches, control information may be sent over more than one carrier of an aggregate, e.g. one or more PCCs and one PCC and one or more SCCs.

A transmission may generally pertain to a specific channel and/or specific resources, in particular with a starting symbol and ending symbol in time, covering the interval therebetween. A scheduled transmission may be a transmission scheduled and/or expected and/or for which resources are scheduled or provided or reserved. However, not every scheduled transmission has to be realized. For example, a scheduled downlink transmission may not be received, or a scheduled uplink transmission may not be transmitted due to power limitations, or other influences (e.g., a channel on an unlicensed carrier being occupied). A transmission may be scheduled for a transmission timing substructure (e.g., a mini-slot, and/or covering only a part of a transmission timing structure) within a transmission timing structure like a slot. A border symbol may be indicative of a symbol in the transmission timing structure at which the transmission starts or ends.

Predefined in the context of this disclosure may refer to the related information being defined for example in a standard, and/or being available without specific configuration from a network or network node, e.g. stored in memory, for example independent of being configured. Configured or configurable may be considered to pertain to the corresponding information being set/configured, e.g. by the network or a network node.

A configuration or schedule, like a mini-slot configuration and/or structure configuration, may schedule transmissions, e.g. for the time/transmissions it is valid, and/or transmissions may be scheduled by separate signaling or separate configuration, e.g. separate RRC signaling and/or downlink control information signaling. The transmission/s scheduled may represent signaling to be transmitted by the device for which it is scheduled, or signaling to be received by the device for which it is scheduled, depending on which side of a communication the device is. It should be noted that downlink control information or specifically DCI signaling may be considered physical layer signaling, in contrast to higher layer signaling like MAC (Medium Access Control) signaling or RRC layer signaling. The higher the layer of signaling is, the less frequent/the more time/resource consuming it may be considered, at least partially due to the information contained in such signaling having to be passed on through several layers, each layer requiring processing and handling.

A scheduled transmission, and/or transmission timing structure like a mini-slot or slot, may pertain to a specific channel, in particular a physical uplink shared channel, a physical uplink control channel, or a physical downlink shared channel, e.g. PUSCH, PUCCH or PDSCH, and/or may pertain to a specific cell and/or carrier aggregation. A corresponding configuration, e.g. scheduling configuration or symbol configuration may pertain to such channel, cell and/or carrier aggregation. It may be considered that the scheduled transmission represents transmission on a physical channel, in particular a shared physical channel, for example a physical uplink shared channel or physical downlink shared channel. For such channels, semi-persistent configuring may be particularly suitable.

Generally, a configuration may be a configuration indicating timing, and/or be represented or configured with corresponding configuration data. A configuration may be embedded in, and/or comprised in, a message or configuration or corresponding data, which may indicate and/or schedule resources, in particular semi-persistently and/or semi-statically.

A control region of a transmission timing structure may be an interval in time for intended or scheduled or reserved for control signaling, in particular downlink control signaling, and/or for a specific control channel, e.g. a physical downlink control channel like PDCCH. The interval may comprise, and/or consist of, a number of symbols in time, which may be configured or configurable, e.g. by (UE-specific) dedicated signaling (which may be single-cast, for example addressed to or intended for a specific UE), e.g. on a PDCCH, or RRC signaling, or on a multicast or broadcast channel. In general, the transmission timing structure may comprise a control region covering a configurable number of symbols. It may be considered that in general the border symbol is configured to be after the control region in time.

The duration of a symbol (symbol time length or interval) of the transmission timing structure may generally be dependent on a numerology and/or carrier, wherein the numerology and/or carrier may be configurable. The numerology may be the numerology to be used for the scheduled transmission.

Scheduling a device, or for a device, and/or related transmission or signaling, may be considered comprising, or being a form of, configuring the device with resources, and/or of indicating to the device resources, e.g. to use for communicating. Scheduling may in particular pertain to a transmission timing structure, or a substructure thereof (e.g., a slot or a mini-slot, which may be considered a substructure of a slot). It may be considered that a border symbol may be identified and/or determined in relation to the transmission timing structure even if for a substructure being scheduled, e.g. if an underlying timing grid is defined based on the transmission timing structure. Signaling indicating scheduling may comprise corresponding scheduling information and/or be considered to represent or contain configuration data indicating the scheduled transmission and/or comprising scheduling information. Such configuration data or signaling may be considered a resource configuration or scheduling configuration. It should be noted that such a configuration (in particular as single message) in some cases may not be complete without other configuration data, e.g. configured with other signaling, e.g. higher layer signaling. In particular, the symbol configuration may be provided in addition to scheduling/resource configuration to identify exactly which symbols are assigned to a scheduled transmission. A scheduling (or resource) configuration may indicate transmission timing structure/s and/or resource amount (e.g., in number of symbols or length in time) for a scheduled transmission.

A scheduled transmission may be transmission scheduled, e.g. by the network or network node. Transmission may in this context may be uplink (UL) or downlink (DL) or sidelink (SL) transmission. A device, e.g. a user equipment, for which the scheduled transmission is scheduled, may accordingly be scheduled to receive (e.g., in DL or SL), or to transmit (e.g. in UL or SL) the scheduled transmission. Scheduling transmission may in particular be considered to comprise configuring a scheduled device with resource/s for this transmission, and/or informing the device that the transmission is intended and/or scheduled for some resources. A transmission may be scheduled to cover a time interval, in particular a successive number of symbols, which may form a continuous interval in time between (and including) a starting symbol and an ending symbol. The starting symbol and the ending symbol of a (e.g., scheduled) transmission may be within the same transmission timing structure, e.g. the same slot. However, in some cases, the ending symbol may be in a later transmission timing structure than the starting symbol, in particular a structure following in time. To a scheduled transmission, a duration may be associated and/or indicated, e.g. in a number of symbols or associated time intervals. In some variants, there may be different transmissions scheduled in the same transmission timing structure. A scheduled transmission may be considered to be associated to a specific channel, e.g. a shared channel like PUSCH or PDSCH.

In the context of this disclosure, there may be distinguished between dynamically scheduled or aperiodic transmission and/or configuration, and semi-static or semi-persistent or periodic transmission and/or configuration. The term "dynamic" or similar terms may generally pertain to configuration/transmission valid and/or scheduled and/or configured for (relatively) short timescales and/or a (e.g., predefined and/or configured and/or limited and/or definite)

number of occurrences and/or transmission timing structures, e.g. one or more transmission timing structures like slots or slot aggregations, and/or for one or more (e.g., specific number) of transmission/occurrences. Dynamic configuration may be based on low-level signaling, e.g. control signaling on the physical layer and/or MAC layer, in particular in the form of DCI or SCI. Periodic/semi-static may pertain to longer timescales, e.g. several slots and/or more than one frame, and/or a non-defined number of occurrences, e.g., until a dynamic configuration contradicts, or until a new periodic configuration arrives. A periodic or semi-static configuration may be based on, and/or be configured with, higher-layer signaling, in particular RCL layer signaling and/or RRC signaling and/or MAC signaling.

A transmission timing structure may comprise a plurality of symbols, and/or define an interval comprising several symbols (respectively their associated time intervals). In the context of this disclosure, it should be noted that a reference to a symbol for ease of reference may be interpreted to refer to the time domain projection or time interval or time component or duration or length in time of the symbol, unless it is clear from the context that the frequency domain component also has to be considered. Examples of transmission timing structures include slot, subframe, mini-slot (which also may be considered a substructure of a slot), slot aggregation (which may comprise a plurality of slots and may be considered a superstructure of a slot), respectively their time domain component. A transmission timing structure may generally comprise a plurality of symbols defining the time domain extension (e.g., interval or length or duration) of the transmission timing structure, and arranged neighboring to each other in a numbered sequence. A timing structure (which may also be considered or implemented as synchronization structure) may be defined by a succession of such transmission timing structures, which may for example define a timing grid with symbols representing the smallest grid structures. A transmission timing structure, and/or a border symbol or a scheduled transmission may be determined or scheduled in relation to such a timing grid. A transmission timing structure of reception may be the transmission timing structure in which the scheduling control signaling is received, e.g. in relation to the timing grid. A transmission timing structure may in particular be a slot or subframe or in some cases, a mini-slot.

Feedback signaling may be considered a form or control signaling, e.g. uplink or sidelink control signaling, like UCI (Uplink Control Information) signaling or SCI (Sidelink Control Information) signaling. Feedback signaling may in particular comprise and/or represent acknowledgement signaling and/or acknowledgement information and/or measurement reporting.

Acknowledgement information may comprise an indication of a specific value or state for an acknowledgement signaling process, e.g. ACK or NACK or DTX. Such an indication may for example represent a bit or bit value or bit pattern or an information switch. Different levels of acknowledgement information, e.g. providing differentiated information about quality of reception and/or error position in received data element/s may be considered and/or represented by control signaling. Acknowledgment information may generally indicate acknowledgment or non-acknowledgment or non-reception or different levels thereof, e.g. representing ACK or NACK or DTX. Acknowledgment information may pertain to one acknowledgement signaling process. Acknowledgement signaling may comprise acknowledgement information pertaining to one or more acknowledgement signaling processes, in particular one or more HARQ or ARQ processes. It may be considered that to each acknowledgment signaling process the acknowledgement information pertains to, a specific number of bits of the information size of the control signaling is assigned. Measurement reporting signaling may comprise measurement information.

Signaling may generally comprise one or more symbols and/or signals and/or messages. A signal may comprise and/or represent one or more bits, which may be modulated into a common modulated signal. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different acknowledgement signaling processes, e.g. representing and/or pertaining to one or more such processes. An indication may comprise signaling and/or a plurality of signals and/or messages and/or may be comprised therein, which may be transmitted on different carriers and/or be associated to different acknowledgement signaling processes, e.g. representing and/or pertaining to one or more such processes.

Signaling utilizing, and/or on and/or associated to, resources or a resource structure may be signaling covering the resources or structure, signaling on the associated frequency/ies and/or in the associated time interval/s. It may be considered that a signaling resource structure comprises and/or encompasses one or more substructures, which may be associated to one or more different channels and/or types of signaling and/or comprise one or more holes (resource element/s not scheduled for transmissions or reception of transmissions). A resource substructure, e.g. a feedback resource structure, may generally be continuous in time and/or frequency, within the associated intervals. It may be considered that a substructure, in particular a feedback resource structure, represents a rectangle filled with one or more resource elements in time/frequency space. However, in some cases, a resource structure or substructure, in particular a frequency resource range, may represent a non-continuous pattern of resources in one or more domains, e.g. time and/or frequency. The resource elements of a substructure may be scheduled for associated signaling.

It should generally be noted that the number of bits or a bit rate associated to specific signaling that can be carried on a resource element may be based on a modulation and coding scheme (MCS). Thus, bits or a bit rate may be seen as a form of resources representing a resource structure or range in frequency and/or time, e.g. depending on MCS. The MCS may be configured or configurable, e.g. by control signaling, e.g. DCI or MAC (Medium Access Control) or RRC (Radio Resource Control) signaling. Different formats of for control information may be considered, e.g. different formats for a control channel like a Physical Uplink Control Channel (PUCCH). PUCCH may carry control information or corresponding control signaling, e.g. Uplink Control Information (UCI). UCI may comprise feedback signaling, and/or acknowledgement signaling like HARQ feedback (ACK/NACK), and/or measurement information signaling, e.g. comprising Channel Quality Information (CQI), and/or Scheduling Request (SR) signaling. One of the supported PUCCH formats may be short, and may e.g. occur at the end of a slot interval, and/or multiplexed and/or neighboring to PUSCH. Similar control information may be provided on a sidelink, e.g. as Sidelink Control Information (SCI), in particular on a (physical) sidelink control channel, like a (P)SCCH.

A code block may be considered a subelement of a data element like a transport block, e.g., a transport block may comprise a one or a plurality of code blocks.

A scheduling assignment may be configured with control signaling, e.g. downlink control signaling or sidelink control signaling. Such controls signaling may be considered to represent and/or comprise scheduling signaling, which may indicate scheduling information. A scheduling assignment may be considered scheduling information indicating scheduling of signaling/transmission of signaling, in particular pertaining to signaling received or to be received by the device configured with the scheduling assignment. It may be considered that a scheduling assignment may indicate data (e.g., data block or element and/or channel and/or data stream) and/or an (associated) acknowledgement signaling process and/or resource/s on which the data (or, in some cases, reference signaling) is to be received and/or indicate resource/s for associated feedback signaling, and/or a feedback resource range on which associated feedback signaling is to be transmitted. Transmission associated to an acknowledgement signaling process, and/or the associated resources or resource structure, may be configured and/or scheduled, for example by a scheduling assignment. Different scheduling assignments may be associated to different acknowledgement signaling processes. A scheduling assignment may be considered an example of downlink control information or signaling, e.g. if transmitted by a network node and/or provided on downlink (or sidelink control information if transmitted using a sidelink and/or by a user equipment).

A scheduling grant (e.g., uplink grant) may represent control signaling (e.g., downlink control information/signaling). It may be considered that a scheduling grant configures the signaling resource range and/or resources for uplink (or sidelink) signaling, in particular uplink control signaling and/or feedback signaling, e.g. acknowledgement signaling. Configuring the signaling resource range and/or resources may comprise configuring or scheduling it for transmission by the configured radio node. A scheduling grant may indicate a channel and/or possible channels to be used/usable for the feedback signaling, in particular whether a shared channel like a PUSCH may be used/is to be used. A scheduling grant may generally indicate uplink resource/s and/or an uplink channel and/or a format for control information pertaining to associated scheduling assignments. Both grant and assignment/s may be considered (downlink or sidelink) control information, and/or be associated to, and/or transmitted with, different messages.

A resource structure in frequency domain (which may be referred to as frequency interval and/or range) may be represented by a subcarrier grouping. A subcarrier grouping may comprise one or more subcarriers, each of which may represent a specific frequency interval, and/or bandwidth. The bandwidth of a subcarrier, the length of the interval in frequency domain, may be determined by the subcarrier spacing and/or numerology. The subcarriers may be arranged such that each subcarrier neighbors at least one other subcarrier of the grouping in frequency space (for grouping sizes larger than 1). The subcarriers of a grouping may be associated to the same carrier, e.g. configurably or configured of predefined. A physical resource block may be considered representative of a grouping (in frequency domain). A subcarrier grouping may be considered to be associated to a specific channel and/or type of signaling, it transmission for such channel or signaling is scheduled and/or transmitted and/or intended and/or configured for at least one, or a plurality, or all subcarriers in the grouping. Such association may be time-dependent, e.g. configured or configurable or predefined, and/or dynamic or semi-static. The association may be different for different devices, e.g. configured or configurable or predefined, and/or dynamic or semi-static. Patterns of subcarrier groupings may be considered, which may comprise one or more subcarrier groupings (which may be associated to same or different signalings/channels), and/or one or more groupings without associated signaling (e.g., as seen from a specific device). An example of a pattern is a comb, for which between pairs of groupings associated to the same signaling/channel there are arranged one or more groupings associated to one or more different channels and/or signaling types, and/or one or more groupings without associated channel/signaling).

Example types of signaling comprise signaling of a specific communication direction, in particular, uplink signaling, downlink signaling, sidelink signaling, as well as reference signaling (e.g., SRS or CRS or CSI-RS), communication signaling, control signaling, and/or signaling associated to a specific channel like PUSCH, PDSCH, PUCCH, PDCCH, PSCCH, PSSCH, etc.).

Throughout this disclosure, the term "user equipment" may be considered an example of a "receiving radio node", and these terms may be used interchangeably. Feature/s assigned to a user equipment may also be implemented in a receiving radio node and vice versa, unless explicitly stated otherwise. A receiving radio node may in particular be a user equipment or terminal. However, in some scenarios, e.g. backhaul or relay scenarios, a receiving radio node may be a network node, in particular a base station and/or gNodeB and/or relay node or transmission point. The term "network node" may be considered an example for a "signaling radio node", and the terms may be interchanged. A network node may be an example of a signaling radio node. However, in some scenarios, e.g. sidelink scenarios, the signaling radio node may be a user equipment or terminal. A signaling radio node arrangement, also referred to as network node arrangement, may comprise one or more radio nodes, in particular network nodes, which may be of the same or different types. Different nodes of the arrangement may be adapted for, and/or provide, different functionalities described herein. A signaling radio node arrangement may in some variants represent a radio access network, and/or a heterogenous network (HetNet), and/or provide dual (or multiple) connectivity, e.g. comprising an anchor node and a booster node, and/or one or more of each or either. The radio nodes of a node arrangement may comprise suitable interfaces for communication between them, e.g. communication interfaces and/or corresponding circuitry. There may generally be considered a signal radio node arrangement, comprising one or more node between which the features and/or functionalities of a signaling radio node as described herein may be distributed.

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other variants and variants that depart from these specific details.

For example, the concepts and variants are partially described in the context of Long Term Evolution (LTE) or LTE-Advanced (LTE-A) or New Radio mobile or wireless communications technologies; however, this does not rule out the use of the present concepts and aspects in connection with additional or alternative mobile communication technologies such as the Global System for Mobile Communications (GSM). While described variants may pertain to certain Technical Specifications (TSs) of the Third Generation Partnership Project (3GPP), it will be appreciated that the present approaches, concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the variants described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. The aspects presented herein can be varied in many ways.

Some useful abbreviations comprise

Abbreviation Explanation

ACK/NACK Acknowledgment/Negative Acknowledgement
ARQ Automatic Repeat reQuest
CAZAC Constant Amplitude Zero Cross Correlation
CBG Code Block Group
CDM Code Division Multiplex
CM Cubic Metric
CQI Channel Quality Information
CRC Cyclic Redundancy Check
CRS Common reference signal
CSI Channel State Information
CSI-RS Channel state information reference signal
DAI Downlink Assignment Indicator
DCI Downlink Control Information
DFT Discrete Fourier Transform
DM(-)RS Demodulation reference signal(ing)
FDM Frequency Division Multiplex
HARQ Hybrid Automatic Repeat Request
IFFT Inverse Fast Fourier Transform
MBB Mobile Broadband
MCS Modulation and Coding Scheme
MIMO Multiple-input-multiple-output
MRC Maximum-ratio combining
MRT Maximum-ratio transmission
MU-MIMO Multiuser multiple-input-multiple-output
OFDM/A Orthogonal Frequency Division Multiplex/Multiple Access
PAPR Peak to Average Power Ratio
PDCCH Physical Downlink Control Channel
PDSCH Physical Downlink Shared Channel
PRACH Physical Random Access CHannel
PRB Physical Resource Block
PUCCH Physical Uplink Control Channel
PUSCH Physical Uplink Shared Channel
(P)SCCH (Physical) Sidelink Control Channel
(P)SSCH (Physical) Sidelink Shared Channel
RB Resource Block
RRC Radio Resource Control
SC-FDM/A Single Carrier Frequency Division Multiplex/Multiple Access
SCI Sidelink Control Information
SINR Signal-to-interference-plus-noise ratio
SIR Signal-to-interference ratio
SNR Signal-to-noise-ratio
SR Scheduling Request
SRS Sounding Reference Signal(ing)
SVD Singular-value decomposition
TDM Time Division Multiplex
UCI Uplink Control Information
UE User Equipment
URLLC Ultra Low Latency High Reliability Communication
VL-MIMO Very-large multiple-input-multiple-output
ZF Zero Forcing Abbreviations may be considered to follow 3G PP usage if applicable.

The invention claimed is:

1. A method of operating a user equipment in a New Radio, NR, radio access network, the method comprising:
    receiving, in a common search space in a first bandwidth part, a Downlink Control Information (DCI) message scheduling transmission on a Physical Downlink Shared Channel (PDSCH) to be received by the user equipment, a first Physical Resource Block (PRB) group size being associated to the first bandwidth part for frequency resource allocation, the DCI message comprising a bit field, the bit field scheduling the PDSCH transmission in a second bandwidth part, a second PRB group size being associated to the second bandwidth part for frequency resource allocation, the first PRB group size being different from the second PRB group size; and
    receiving the scheduled PDSCH transmission in the second bandwidth part based on the bit field utilizing the second PRB group size.

2. The method according to claim 1, wherein the first PRB group size corresponds to a number of PRBs in a PRB group, and the second PRB group size corresponds to a different number of PRBs in a PRB group.

3. The method according to claim 1, wherein the user equipment is configured with a set of bandwidth parts, the set of bandwidth parts comprising a plurality of bandwidth parts, on one of which the user equipment is active, the set of bandwidth parts comprising the first bandwidth part and the second bandwidth part.

4. The method according to claim 1, wherein the bit field indicates a bit map mapped to PRB groups beginning at a reference PRB group in frequency space, the reference PRB group being the lowest frequency PRB group in the second bandwidth part.

5. The method according to claim 1, wherein the DCI message indicates that the bit field allocates resources based on the second PRB group size.

6. The method according to claim 1, wherein the first and second bandwidth parts are associated to the same carrier.

7. The method according to claim 1, wherein the common search space is configured with system information.

8. A user equipment for a New Radio (NR) radio access network, the user equipment comprising processing circuitry and radio circuitry and being configured to utilize the processing circuitry and radio circuitry to:

receive, in a common search space in a first bandwidth part, a Downlink Control Information (DCI) message scheduling transmission on a Physical Downlink Shared Channel (PDSCH) to be received by the user equipment, a first Physical Resource Block (PRB) group size being associated to the first bandwidth part for frequency resource allocation, the DCI message comprising a bit field, the bit field scheduling the PDSCH transmission in a second bandwidth part, a second PRB group size being associated to the second bandwidth part for frequency resource allocation, the first PRB group size being different from the second PRB group size; and receive the scheduled PDSCH transmission in the second bandwidth part based on the bit field utilizing the second PRB group size.

9. The user equipment according to claim 8, wherein the first PRB group size corresponds to a number of PRBs in a PRB group, and the second PRB group size corresponds to a different number of PRBs in a PRB group.

10. The user equipment according to claim 8, wherein the user equipment is configured with a set of bandwidth parts, the set of bandwidth parts comprising a plurality of bandwidth parts, on one of which the user equipment is active, the set of bandwidth parts comprising the first bandwidth part and the second bandwidth part.

11. The user equipment according to claim 8, wherein the bit field indicates a bit map mapped to PRB groups beginning at a reference PRB group in frequency space, the reference PRB group being the lowest frequency PRB group in the second bandwidth part.

12. The user equipment according to claim 8, wherein the DCI message indicates that the bit field allocates resources based on the second PRB group size.

13. The user equipment according to claim 8, wherein the first and second bandwidth parts are associated to the same carrier.

14. The user equipment according to claim 8, wherein the common search space is configured with system information.

15. A network node for a radio access network, the network node comprising processing circuitry and radio circuitry and being configured to utilize the processing circuitry and the radio circuitry to:

transmit to a user equipment, in a common search space in a first bandwidth part, a Downlink Control Information (DCI) message scheduling transmission on a Physical Downlink Shared Channel (PDSCH) to be received by the user equipment, a first Physical Resource Block (PRB) group size being associated to the first bandwidth part for frequency resource allocation, the DCI message comprising a bit field, the bit field scheduling the PDSCH transmission in a second bandwidth part, a second PRB group size being associated to the second bandwidth part for frequency resource allocation, the first PRB group size being different from the second PRB group size; and transmit the scheduled PDSCH transmission in the second bandwidth part on the frequency resources allocated based on the second PRB group size.

16. The network node according to claim 15, wherein the first PRB group size corresponds to a number of PRBs in a PRB group, and the second PRB group size corresponds to a different number of PRBs in a PRB group.

17. The network node according to claim 15, the network node being configured to utilize the processing circuitry and the radio circuitry to configure the user equipment with a set of bandwidth parts, the set of bandwidth parts comprising a plurality of bandwidth parts, on one of which the user equipment is active, the set of bandwidth parts comprising the first bandwidth part and the second bandwidth part.

18. The network node according to claim 15, wherein the bit field indicates a bit map mapped to PRB groups beginning at a reference PRB group in frequency space, the reference PRB group being the lowest frequency PRB group in the second bandwidth part.

19. The network node according to claim 15, wherein the DCI message indicates that the bit field allocates resources based on the second PRB group size.

20. The network node according to claim 15, the network node being configured to utilize the processing circuitry and the radio circuitry to configure the common search space with system information.

* * * * *